United States Patent
Stovall et al.

(10) Patent No.: US 9,879,600 B2
(45) Date of Patent: Jan. 30, 2018

(54) TURBINE COMPONENT COOLING SYSTEM

(75) Inventors: Steven David Stovall, Anderson, SC (US); George Martin Gilchrist, III, Greenville, SC (US); John Victor Hains, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1403 days.

(21) Appl. No.: 13/460,001

(22) Filed: Apr. 30, 2012

(65) Prior Publication Data

US 2013/0284420 A1 Oct. 31, 2013

(51) Int. Cl.
*G05D 23/00* (2006.01)
*F02C 7/12* (2006.01)

(52) U.S. Cl.
CPC .......... *F02C 7/12* (2013.01); *F05D 2270/303* (2013.01)

(58) Field of Classification Search
CPC ..... F02C 7/12; F05D 2270/303; F24F 11/053; F25D 17/045
USPC ................. 361/694, 695, 698; 60/728, 785; 236/49.3
See application file for complete search history.

(56) References Cited

U.S. PATENT DOCUMENTS

| | | | |
|---|---|---|---|
| 3,232,337 A | | 2/1966 | Swenson et al. |
| 3,605,406 A | * | 9/1971 | Woolley ..................... 60/39.182 |
| 4,455,820 A | * | 6/1984 | Buckley et al. ................. 60/773 |
| 4,601,202 A | | 7/1986 | Colman et al. |
| 4,698,761 A | * | 10/1987 | Cooper .................. G05D 23/24 |
| | | | 123/198 D |
| 5,040,377 A | * | 8/1991 | Braun ................... F25B 49/027 |
| | | | 165/299 |
| 5,860,279 A | * | 1/1999 | Bronicki ................. F01K 23/04 |
| | | | 165/85 |
| 6,446,941 B1 | * | 9/2002 | Maheshwari ............. F28B 9/06 |
| | | | 165/900 |
| 6,588,499 B1 | * | 7/2003 | Fahlsing ................... F28B 1/06 |
| | | | 165/111 |

(Continued)

FOREIGN PATENT DOCUMENTS

| | | |
|---|---|---|
| CN | 1807853 A | 7/2006 |
| JP | 05222904 | 8/1993 |
| WO | 2009064242 A1 | 5/2009 |

OTHER PUBLICATIONS

Opinion Notice for First Examination for Chinese Patent Application No. 201310151622, dated Jun. 30, 2015, 26 pages. English translation provided.

(Continued)

*Primary Examiner* — Kun Kai Ma
(74) *Attorney, Agent, or Firm* — Ernest G. Cusick; Hoffman Warnick LLC (57) ABSTRACT

Systems for cooling turbine components via fluid filled conduits are disclosed. Various embodiments include a system having: a set of fan systems for cooling a set of conduits, the set of conduits fluidly connected with a turbine component; a temperature sensor operably connected to the turbine component, the temperature sensor for obtaining a temperature indicator of the turbine component; and a control system operably connected to the set of fan systems and the temperature sensor, the control system for modifying a speed of at least one fan system in the set of fan systems across a range of speeds in response to determining the temperature indicator deviates from a predetermined range of temperature values.

15 Claims, 4 Drawing Sheets

(56) References Cited

U.S. PATENT DOCUMENTS

| | | |
|---|---|---|
| 6,644,030 B2 | 11/2003 | Moss et al. |
| 6,672,075 B1 | 1/2004 | Sandu et al. |
| 6,842,718 B2 | 1/2005 | Byrd et al. |
| 7,716,930 B2 | 5/2010 | Chiller et al. |
| 2005/0086943 A1 | 4/2005 | Grove et al. |
| 2007/0205297 A1* | 9/2007 | Finkam et al. ............... 236/1 C |
| 2007/0224030 A1* | 9/2007 | Chang et al. .................. 415/47 |
| 2008/0095611 A1 | 4/2008 | Storage et al. |
| 2009/0078219 A1* | 3/2009 | Marsh ...................... F01P 1/06 123/41.02 |
| 2009/0308051 A1 | 12/2009 | Henderson et al. |
| 2010/0180571 A1 | 7/2010 | Zysman et al. |
| 2011/0066298 A1* | 3/2011 | Francino et al. ............. 700/290 |
| 2011/0146307 A1* | 6/2011 | Ofer ..................... F01K 23/101 62/89 |
| 2012/0180768 A1* | 7/2012 | Marsh et al. ................. 123/542 |
| 2012/0234266 A1* | 9/2012 | Faulkner .................. F01P 3/12 123/41.1 |

OTHER PUBLICATIONS

Notice of Preliminary Rejection for Japanese Application No. 2013093291, dated Feb. 21, 2017, 7 pages.
European Search Report, Application No. EP13164866, dated Sep. 29, 2017, 7 pages.

* cited by examiner

TURBINE COMPONENT COOLING SYSTEM

FIELD OF THE INVENTION

The subject matter disclosed herein relates to systems for cooling turbine components. More particularly, aspects of the disclosure relate to systems for controlling the cooling of turbine components.

BACKGROUND OF THE INVENTION

Conventional cooling water systems for turbine components employ digital controls which place the cooling system in one of two modes: on or off. These cooling water systems may not consider ambient temperature gradients (aside from a lower limit), or temperatures of components being cooled. Additionally, these systems are designed for continuous, maximum operation of the cooling system. When the ambient temperature reaches or approaches the lower limit, these conventional systems continue to run. These processes and controls can be inefficient and costly.

BRIEF DESCRIPTION OF THE INVENTION

Systems for cooling turbine components are disclosed. Various embodiments include a system having: a set of fan systems for cooling a set of conduits, the set of conduits fluidly connected with a turbine component; a temperature sensor operably connected to the turbine component, the temperature sensor for obtaining a temperature indicator of the turbine component; and a control system operably connected to the set of fan systems and the temperature sensor, the control system for modifying a speed of at least one fan system in the set of fan systems across a range of speeds in response to determining the temperature indicator deviates from a predetermined range of temperature values.

A first aspect of the invention includes a system having: a set of fan systems for cooling a set of conduits, the set of conduits fluidly connected with a turbine component; a temperature sensor operably connected to the turbine component, the temperature sensor for obtaining a temperature indicator of the turbine component; and a control system operably connected to the set of fan systems and the temperature sensor, the control system for modifying a speed of at least one fan system in the set of fan systems across a range of speeds in response to determining the temperature indicator deviates from a predetermined range of temperature values.

A second aspect of the invention includes a system having: a control system operably connected to a set of turbine fan systems configured to cool a turbine cooling fluid, the control system configured to: modifying a speed of at least one fan system in the set of fan systems across a range of speeds in response to determining a temperature of the turbine cooling fluid deviates from a predetermined range of temperature values.

A third aspect of the invention includes a system having: at least one computing device configured to control a set of fan systems by performing the following: determining a temperature of a turbine cooling fluid; and modifying a speed of at least one fan system in the set of fan systems across a range of speeds in response to determining the temperature of the turbine cooling fluid deviates from a predetermined range of temperature values.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Aspects of the invention disclosed herein relates to systems for cooling turbine components (e.g., a gas turbine components and gas turbine accessories). More particularly, aspects of the disclosure relate to systems for controlled cooling of turbine components using cooling fluid conduits.

As noted herein, conventional cooling water systems for turbines employ digital controls which place the cooling system in one of two modes: on or off. These cooling water systems may not consider ambient temperature gradients (aside from a lower limit), or temperatures of components being cooled. Additionally, these systems are designed for continuous, maximum operation of the cooling system. When the ambient temperature reaches or approaches the lower limit, these conventional systems continue to run. That is, these conventional systems continue running the cooling fans regardless of whether cooling of the water or cooling fluid mixture is actually required.

In contrast to these conventional cooling water systems, various embodiments of the invention include a system which controls its cooling water fans to provide a desired cooling effect to turbine components. That is, systems disclosed according to various embodiments of the invention control the speed of one or more fans across a range of speeds (e.g., from 360 revolutions-per-minute (RPMs), to 1200 RPMs, to 1800 RPMs etc.) to meet the cooling needs of the turbine components. The system can adjust the speed of one or more fans across this range of speeds to achieve the desired cooling effect. It is understood that in various embodiments of the invention, this "range" of speeds can span from approximately one (1) RPM to a maximum RPM level for each fan system. That is, this range of speeds could span from approximately 1 RPM to 1800 RPMs in some cases, but as is known in the art, these speeds could vary while remaining within the scope of the disclosed invention. In various embodiments of the invention, systems can adjust the speed of one or more fans such that the speed is set at a particular level within this range of speeds. Even further, as described herein, in various embodiments of the invention, systems can adjust the speed of one or more fans in response to determining a temperature of one or more points/components of interest relating to the turbine and its components.

Figure 1:
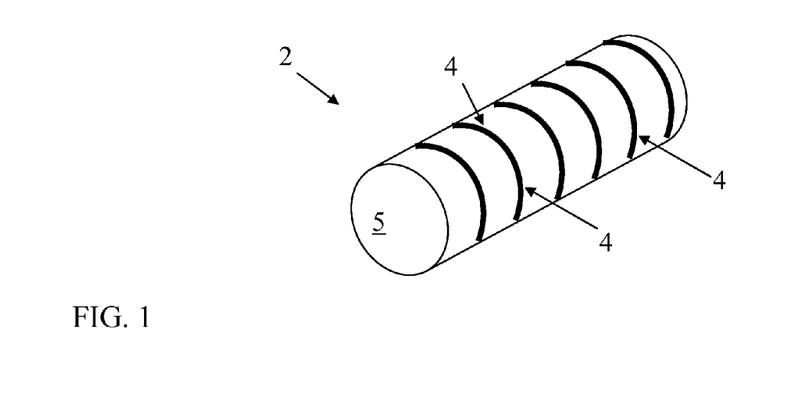
FIG. 1 shows a three-dimensional perspective view of a conduit according to various embodiments of the invention.
Figure 2:
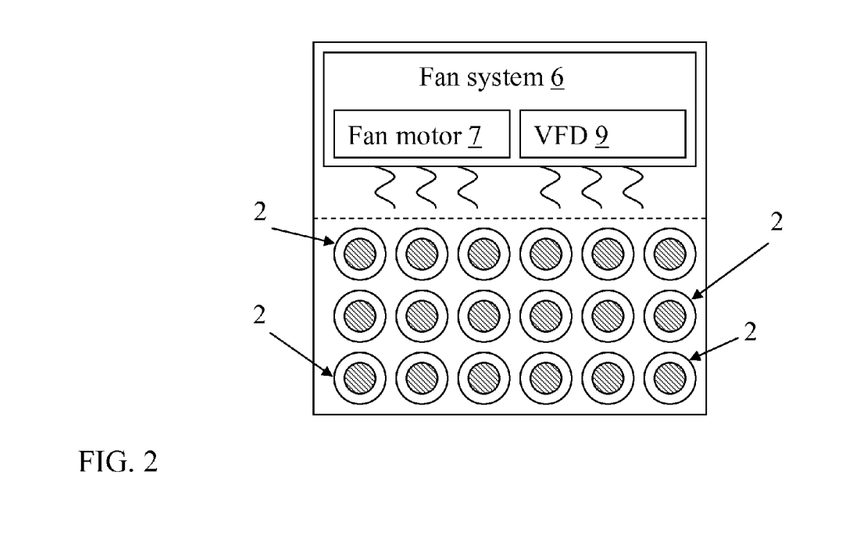
FIG. 2 shows a cross-sectional schematic view of a fan system and a plurality of conduits according to various embodiments of the invention.

Turning to FIG. 1, three-dimensional perspective view of a cooling conduit 2 is shown according to various embodiments of the invention. The cooling conduit 2 is shown including a plurality of heat exchange elements 4 which are configured to allow for cooling of the conduit 2, e.g., via convection cooling across the heat exchange elements 4 and/or the body 5 of the conduit 2. In some cases, the heat exchange element 4 includes a heat exchange fin, ridge or other heat exchange element. FIG. 2 shows a schematic cross-sectional end view of a fan system 6 fluidly connected with a set of conduits 2 (including a plurality of conduits 2), where those conduits 2 are configured to provide a cooling fluid (e.g., a cooling water or mixture) to one or more components of the turbine system (not shown). The set of conduits 2 can be fluidly connected with the turbine component(s) to provide the cooling fluid for modifying a temperature of the turbine component(s). As shown, each fan system 6 can include a fan/fan motor 7 and a variable frequency drive (VFD) 9 for modifying an operating speed of the fan/fan motor 7. As will be described further herein, the fan system 6 can be operably connected (e.g., via conventional wireless and/or hard-wired means) to a control system (FIG. 3).

Figure 3:
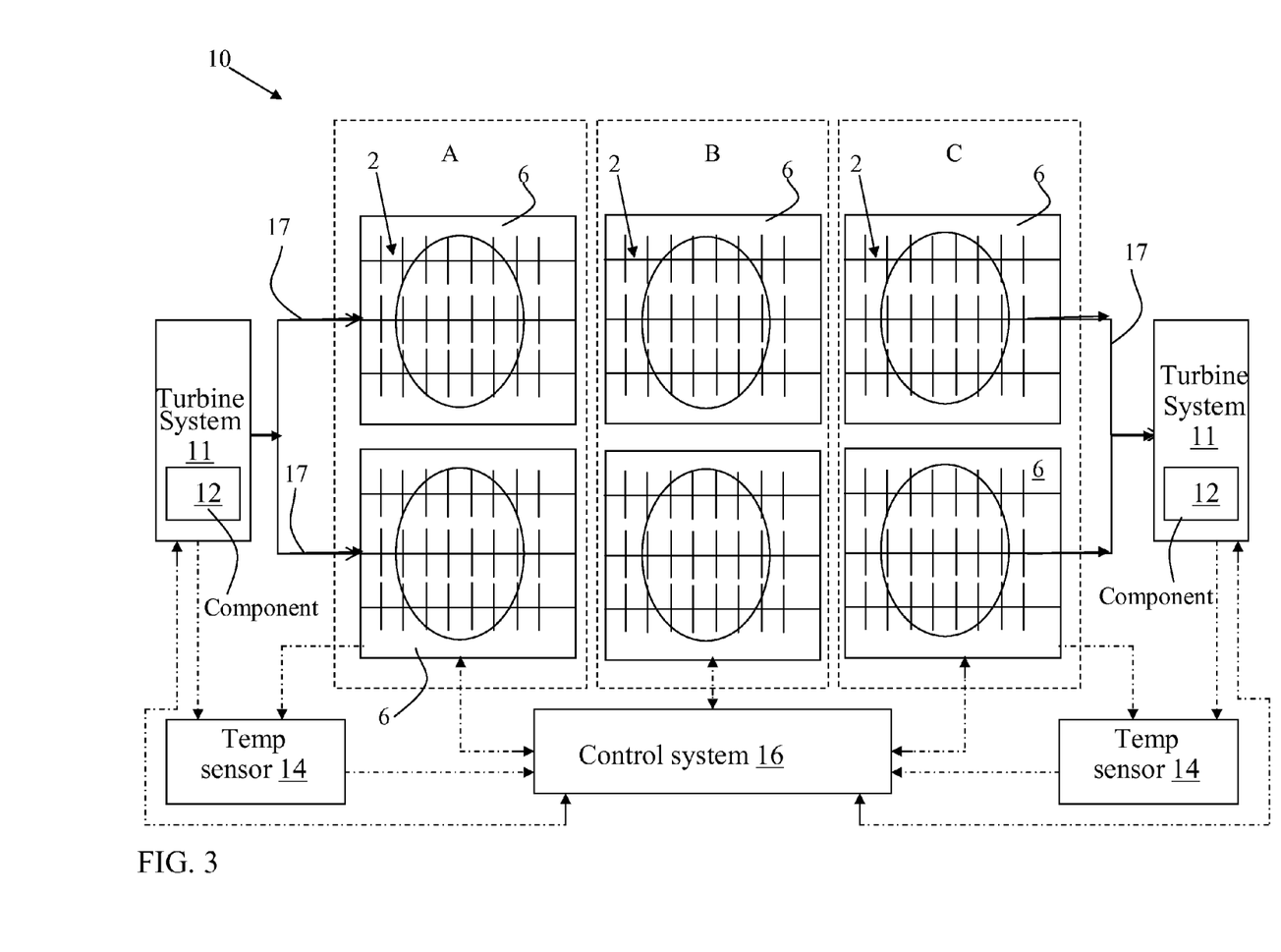
FIG. 3 shows a schematic depiction of a cooling system according to various embodiments of the invention.

FIG. 3 shows a schematic view of a cooling system 10 for cooling one or more turbine component(s) 12 within a turbine system 11 (e.g., a gas turbine and its related gas turbine accessories). The cooling system 10 can include a set of fan systems 6 as described with respect to FIG. 2. The cooling system 10 can further include at least one temperature sensor 14 operably connected to the cooling system 10 and/or the turbine components 12 (data connections indicated by dashed-dotted lines). The temperature sensor(s) 14 can obtain a temperature indicator of cooling system 10 and/or the turbine components 12, e.g., during operation of the turbine system 11. It is understood that the temperature sensor(s) 14 can be operably connected (e.g., physically connected, wirelessly connected, or connected via hard-wired means) to the cooling system 10, various turbine components 12 of the turbine system 11 and/or the control system 16 (shown and described further herein) at any location on those system(s).

As noted, the cooling system 10 can further include a control system 16 operably connected to each fan system 6 in the set of fan systems, the turbine system 11, and the turbine components 12. The control system 16 can modify a speed of one or more fan systems 6 in the set of fan systems in response to determining the temperature indicator deviates from a predetermined range of temperature values. In particular, the control system 16 is configured to provide instructions to the variable frequency drive 9 (FIG. 2) of each fan system 6 to modify the operation (e.g., operating speed) of the fan motor 7 in that fan system 6. For example, in some cases, the control system 16 can increase the operating speed of the fan motor 7 (e.g., via modifying the output of the variable frequency drive 9) in response to determining the temperature indicator exceeds an upper limit of the predetermined range (indicating an undesirably high temperature). Alternatively, the control system 16 can decrease the operating speed of the fan motor 7 in response to determining the temperature indicator is below a lower limit of the predetermined range (indicating an undesirably low temperature). The predetermined range of temperature values can be dictated by desired operating temperatures of the turbine components 12 or other aspects in the turbine system 11 (e.g., ambient air temperatures, turbine load conditions, air/fluid inlet and/or outlet temperatures, etc.).

The control system 16 is also configured to monitor a set (e.g., two or more) of fan systems 6 and independently modify the operating speed of the fan motor 7 in each fan system 6 within that set of fan systems 6. In many cases, this allows the control system 16 to set the operating speed of distinct fan systems 6 to distinct levels.

FIG. 3 illustrates top schematic views of a plurality of fan systems 6 overlying conduits in a similar manner as shown and described with reference to FIG. 2. In this case, two parallel groups of fan systems 6 are arranged for cooling a turbine fluid (e.g., cooling water or a cooling mixture). As shown, at least two of the fan systems 6 are arranged in parallel, and in this case, six fan systems 6 are shown, in two distinct groups, where the two distinct groups are arranged in parallel. Fluidly connecting the fan systems 6 are conduits which can carry the cooling fluid to the turbine component 12. In some cases, the conduits 2 running through each fan system 6 connect to a common conduit 17 which can pass between fan systems 6 and/or additional components such as the turbine system 11. As noted, the arrangement show in FIG. 3 can include a schematic representation, and is not intended to limit the invention in any way. For example, cooling system 10 may have more or less than six fan systems 6 and more or less parallel and series configurations of these fan systems 6.

In various embodiments of the invention, the control system 16 is configured to perform functions to actively monitor and modify the operating speed of one or more fan systems 6 in a set (e.g., two or more) of fan systems. In one embodiment, the control system 16 is configured to set a speed of the entire sets of fan systems 6 to a first level. For example, upon start-up of the fan systems 6, all fan systems 6 can be set to an operating speed of approximately 100 percent of capacity. Following this startup phase, the control system 16 can determine the temperature indicator (e.g., from one or more temperature sensors 14) and compare that indicator to the predetermined range of temperature values to determine whether the turbine components 12 and/or turbine system 11 are at a temperature above or below the desired range.

In the case that the temperature indicator is below the predetermined range of temperature values, the control system 16 provides instructions to at least one fan system 6 (or a section of fan systems 6, indicated by section "A") to reduce the speed of the fan system(s) 6 to a second level below the first level. In some cases, the second, reduced level is approximately 33% below the first level. In some cases, where the temperature indicator remains below the predetermined range of temperature values, the control system 16 can additionally reduce the operating speed of additional fan system(s) 6 (or a section of fan systems 6, indicated by section "B"). This speed reduction can be performed progressively among a group of fan systems 6 (e.g., among sections A, B and C). Additionally, where a subsequent temperature indicator indicates a temperature of the component is below a second, lower threshold level less than the predetermined range of temperature values, the control system 16 can further reduce the speed of an additional fan system 6 in the set of fan systems. It is understood that the control system 16 can continuously obtain subsequent temperature indicators (e.g., from temperature sensors 14) about a temperature of turbine components 12 to modify the operating speed of one or more fan systems 6 in real-time, that is, substantially instantaneously with a change in the temperature indicator from the previous level to the subsequent level.

It is understood that in some embodiments, the speed of a first fan system 6 or a group of fan systems (e.g., Group C) can be set (by control system 16) to a first (e.g., relatively high) speed in the range of speeds, and a second, distinct fan system 6 (or group of fan systems, e.g., Group B) can be set to a second speed which is lower than the first speed, in response to determining the temperature indicator 24 deviates from the predetermined range of temperature values. In some embodiments, one or more fan system(s) 6 (e.g., a group of fan systems) can be turned off completely, while other fan system(s) 6 remain in operation. In this case, the fan system(s) 6 which continue to operate could be set at distinct speeds.

In even further embodiments, the control system 16 can leave a group of fan systems 6 (e.g., Group C) running substantially continuously, while modifying the speed of one or more fan system(s) 6 in the remaining groups (e.g., Groups A and/or B) until the temperature indicator 24 falls within the predetermined range of temperature values. In these cases, the control system 16 can set the group of continuously running fan systems 6 at a low or mid-level speed (between the upper and lower speeds) and can increase the speed of these fan systems 6 in response to an increased cooling requirement (e.g., temperature indicator 24 exceeding the predetermined threshold). The setting and operation of each fan system 6 in the cooling system 10 relating to changing operation of certain sections of fan systems 6 is for illustrative purposes, with a combination of above stated operating conditions allowed while operating the cooling system 10. Additionally, the example including three distinct fan system 6 sections is for illustrative purposes only, where one or more fan systems 6 may be used in combination (or in isolation) to achieve the effects described according to various embodiments of the invention.

Figure 4:
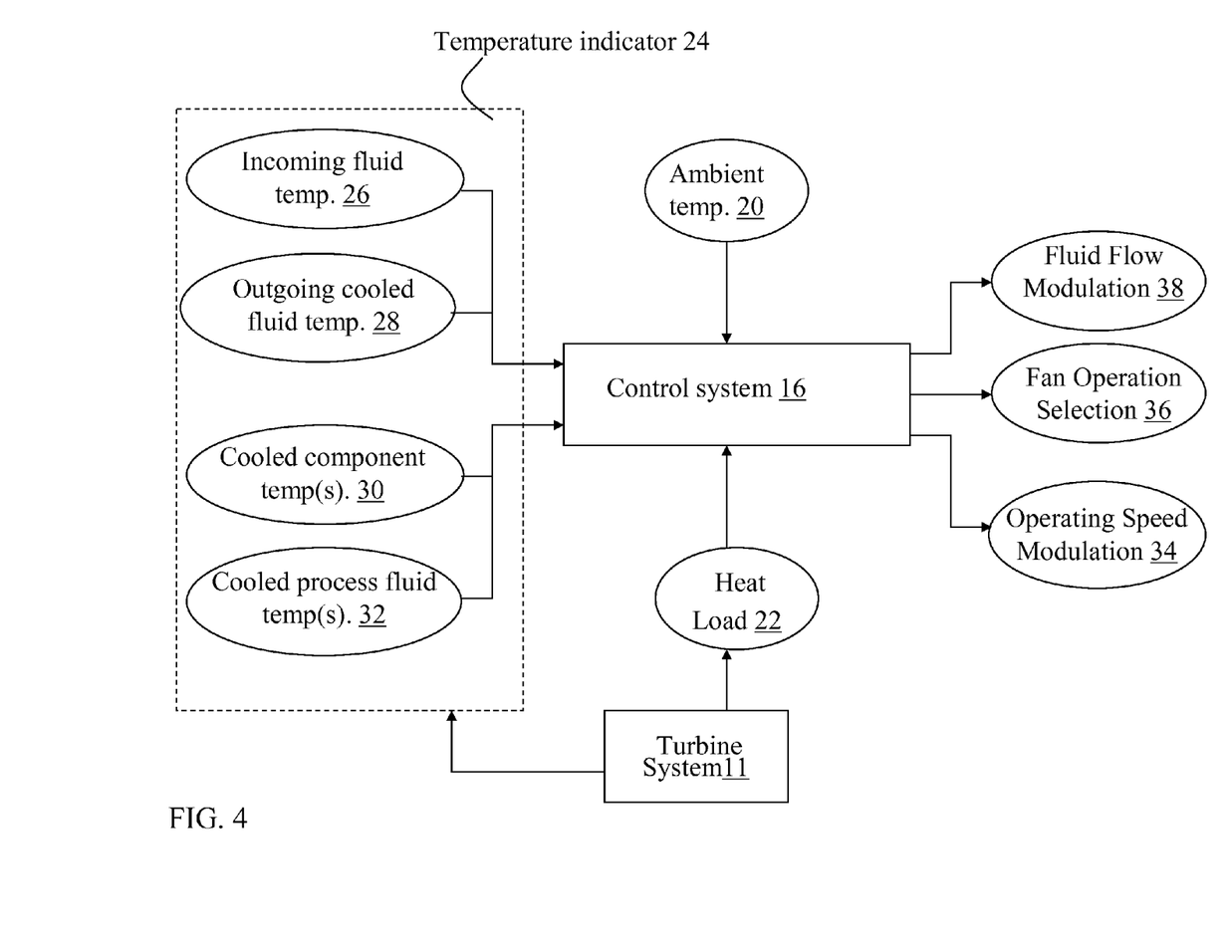
FIG. 4 shows a data flow diagram according to various embodiments of the invention.

FIG. 4 shows a schematic data flow diagram illustrating logic operations performed according to various embodiments of the invention. As shown, the control system 16 is configured to obtain data such as ambient temperature data 20 (e.g., from one or more ambient temperature sensors) and heat load data 22 from sensors on the turbine (e.g., gas turbine and related accessories). The control system can further obtain temperature indicators 24 as described with reference to FIG. 4, where those temperature indicators 24 can include one or more of: an incoming fluid temperature 26, an outgoing cooled fluid temperature 28, a cooled component temperatures 30, and a cooled process fluid temperature 32. The control system can continuously monitor these temperature indicators 24 and compare those indicators with a predetermined threshold range to determine whether to modify the operation of one or more fan systems 6. As shown, the control system 16 can modify the operating speed (e.g., via operating speed modulation instructions 34), which fans are operating (e.g., via fan operation selection instructions 36) and/or the volume of fluid flowing through the conduits via fluid flow modulation 38, in order to achieve a desired temperature. The predetermined threshold range can be determined based upon the ambient temperature data 20 and/or the heat load data 22 and which can be continuously obtained from one or more of the ambient temperature sensors, fluid temperature sensors, and/or the turbine component sensors.

As will be appreciated by one skilled in the art, the control system 16 described herein may be embodied as a system(s), method(s) or computer program product(s), e.g., as part of a gas turbine monitoring system. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer (or controller) program code for carrying out operations of the present invention may be written in any programming language(s), for example, but not limited to, an object oriented programming language such as Java, Magik, Smalltalk, C++ or the like and conventional procedural programming languages, such as the "C" programming language, proprietary software, controller language, embedded or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to data flow illustrations and/or block diagrams of methods, apparatus (systems) and computer program products according to embodiments of the invention. It will be understood that each block of the data flow illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 5:
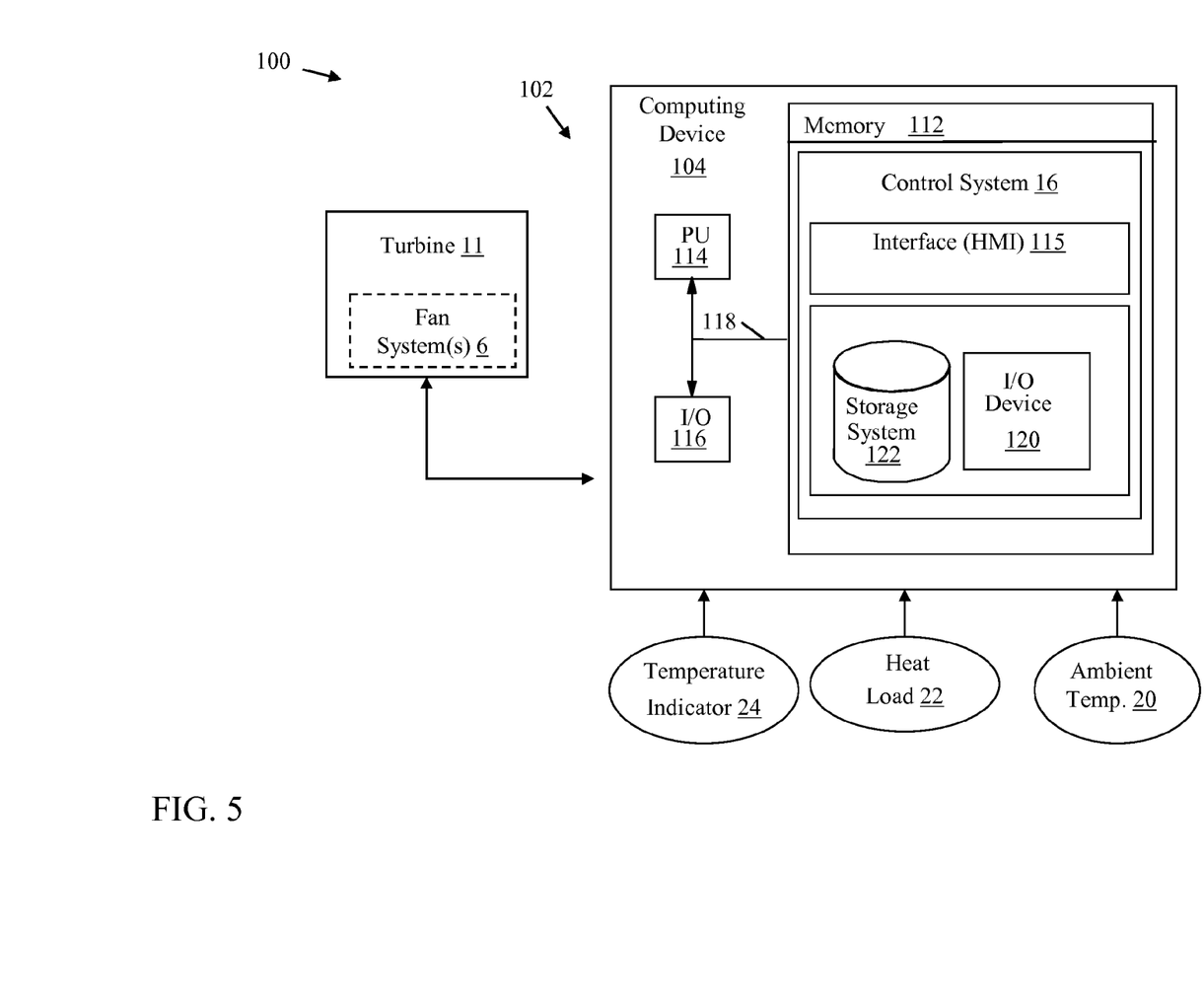
FIG. 5 shows an illustrative environment including a control system according to various embodiments of the invention.

Turning to FIG. 5, an illustrative environment 100 including the control system (e.g., a gas turbine control system) 16 is shown according to embodiments of the invention. Environment 100 includes a computer infrastructure 102 that can perform the various processes described herein. In particular, computer infrastructure 102 is shown including a computing device 104 that comprises the control system 16, which enables computing device 104 to provide real-time control of fan system(s) 6, which may be located within the turbine system 11 or proximate the turbine system 11 (as indicated by phantom lines), by performing the processes of the disclosure. It is understood that the control system 16 can include an interface (e.g., a human machine interface (HMI)) 115 configured to execute some or all of the functions of the control system 16 described herein. The interface 115 can include one or more I/O devices 120 having one or more displays, actuatable buttons, touch screens, etc. for allowing a human operator to interact with the control system 16. In some cases, the interface 115 can include a standard industrial human-machine/man-machine interface (HMI/MMI) system which can act as an interface between human and machine, human and plant, machine and software etc.

Computing device 104 is shown including a memory 112, a processor (PU) 114, an input/output (I/O) interface 116, and a bus 118. Further, computing device 104 is shown including an I/O device/resource 120 and a storage system 122. As is known in the art, in general, processor 114 executes computer program code, such as control system 16, that is stored in memory 112 and/or storage system 122. While executing computer program code, processor 114 can read and/or write data, such as temperature indicator data 24 (e.g., incoming fluid temperature data 26, outgoing cooled fluid temperature data 28, cooled component temperature data 30, and/or cooled process fluid temperature data 32, ambient temperature data 20 and/or heat load data 22 to/from memory 112, storage system 122, and/or I/O interface 116. Bus 118 provides a communications link between each of the components in computing device 104. I/O device 120 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

As shown in FIG. 5, environment 100 may optionally include the turbine system (e.g., a gas turbine and associated gas turbine accessories) 11 operably connected to the control system 16 (e.g., via the computing device 104), where the computing device 104 and turbine system 11 are connected via any type of conventional network, for example, an industrial/home/IP/serial network. The turbine system 11 can be connected to the control system 16 (via computing device 104) via conventional means (e.g., via wireless or hard-wired means).

In any event, computing device 104 can comprise any general purpose computing article of manufacture capable of executing computer program code installed by a user (e.g., a personal computer, server, handheld device, etc.). However, it is understood that computing device 104 and control system 16 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As mentioned herein, control system 16 has the technical effect of enabling computing infrastructure 102 to perform, among other things, the turbine cooling control functions described herein. It is understood that some of the various components shown in FIG. 5 can be implemented independently, combined, and/or stored in memory for one or more separate computing devices that are included in computer infrastructure 102. Further, it is understood that some of the components and/or functionality may not be implemented, or additional schemas and/or functionality may be included as part of environment 100.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system comprising:
    a gas turbine system including a gas turbine and at least one gas turbine component;
    a set of conduits configured to provide a cooling fluid to the at least one gas turbine component, the cooling fluid cooling the at least one gas turbine component;
    a set of fan systems for cooling the set of conduits, the set of conduits fluidly connected with the at least one gas turbine component wherein each fan system includes:
        a fan;
        a fan motor operably connected with the fan; and
        a variable frequency drive for modifying an operating speed of the fan motor;
    a temperature sensor operably connected to the at least one gas turbine component, the temperature sensor for obtaining a temperature indicator of the at least one gas turbine component; and
    a control system operably connected to the set of fan systems and the temperature sensor, the control system for modifying a speed of at least one fan system in the set of fan systems across a range of speeds by providing instructions to the variable frequency drive to:
        increase the operating speed of the fan motor in response to determining the temperature indicator exceeds an upper limit of the predetermined range; and
        decrease the operating speed of the fan motor in response to determining the temperature indicator is below a lower limit of the predetermined range.

2. The system of claim 1, wherein at least two fan systems in the set of fan systems are arranged in parallel.

3. The system of claim 1, wherein the set of fan systems includes two distinct groups of serially connected fans, the two distinct groups being arranged in parallel.

4. The system of claim 1, wherein each conduit in the set of conduits includes a heat exchange element.

5. The system of claim 1, wherein the control system is configured to perform the following:
    set a speed of the set of fan systems to a first speed in the range of speeds; and
    reduce the speed of a fan system in the set of fan systems to a second speed below the first speed in response to determining the temperature indicator is below the predetermined range of temperature values.

6. The system of claim 5, wherein the control system is further configured to reduce the speed of an additional fan system in the set of fan systems in response to determining a subsequent temperature indicator is below the predetermined range of temperature values.

7. The system of claim 1, wherein the control system is configured to perform the following:
    set a speed of a first fan system in the set of fan systems to a first speed in the range of speeds; and
    set a speed of a second fan system in the set of fan systems to a second speed less than the first speed in response to determining the temperature indicator deviates from the predetermined range of temperature values.

8. A system comprising:
    a gas turbine system including a gas turbine and at least one gas turbine component;
    a cooling fluid provided to the at least one gas turbine component, the cooling fluid cooling the at least one gas turbine component;
    a control system operably connected to a set of fan systems configured to cool the cooling fluid, wherein each fan system in the set of fan systems includes:
        a fan;
        a fan motor operably connected with the fan; and
        a variable frequency drive for modifying an operating speed of the fan motor, the control system configured to:
    modify a speed of at least one fan system in the set of fan systems across a range of speeds by providing instructions to the variable frequency drive to:
        increase the operating speed of the fan motor in response to determining a temperature of the cooling fluid exceeds an upper limit of the predetermined range, and
        to decrease the operating speed of the fan motor in response to determining the temperature of the cooling fluid is below a lower limit of the predetermined range.

9. The system of claim 8, wherein at least two fan systems in the set of fan systems are arranged in parallel.

10. The system of claim 8, wherein the set of fan systems includes two distinct groups of serially connected fans, the two distinct groups being arranged in parallel.

11. The system of claim 8, wherein the control system is further configured to perform the following:
    set a speed of the set of fan systems to first speed in the range of speeds; and
    reduce the speed of a fan system in the set of fan systems to a second speed less than the first speed in response to determining the temperature is below the predetermined range of temperature values.

12. The system of claim 11, wherein the control system is further configured to reduce the speed of an additional fan system in the set of fan systems in response to determining a subsequent temperature indicator is below the predetermined range of temperature values.

13. A system comprising:
    a gas turbine system including a gas turbine and at least one gas turbine component;
    a set of conduits containing a cooling fluid, the set of conduits fluidly connected to the at least one gas turbine component, the cooling fluid cooling the at least one gas turbine component;
    at least one computing device configured to control a set of fan systems wherein the set of fan systems is configured to cool the cooling fluid, wherein each fan system in the set of fan systems includes:
        a fan;
        a fan motor operably connected with the fan; and a variable frequency drive for modifying an operating speed of the fan motor, by performing the following:

determining a temperature of the cooling fluid; and modifying a speed of at least one fan system in the set of fan systems across a range of speeds in response to determining the temperature of the cooling fluid deviates from a predetermined range of temperature values.

14. The system of claim 13, wherein the at least one computing device is further configured to perform the following:

set a speed of the set of fan systems to first speed in the range of speeds; and reduce the speed of a fan system in the set of fan systems to a second speed less than the first speed in response to determining the temperature is below the predetermined range of temperature values.

15. The system of claim 14, wherein the at least one computing device is further configured to reduce the speed of an additional fan system in the set of fan systems in response to determining a subsequent temperature indicator is below the predetermined range of temperature values.

\* \* \* \* \*